United States Patent [19]

Takei

[11] Patent Number: 5,388,914
[45] Date of Patent: Feb. 14, 1995

[54] LINEAR MOTION ROLLING GUIDE UNIT

[75] Inventor: Seiji Takei, Kanagawa, Japan

[73] Assignee: Nippon Thompson Co., Ltd., Tokyo, Japan

[21] Appl. No.: 117,623

[22] Filed: Sep. 8, 1993

[30] Foreign Application Priority Data

Sep. 25, 1992 [JP] Japan .............................. 4-072901[U]

[51] Int. Cl.6 .............................................. F16C 29/06
[52] U.S. Cl. ........................................ 384/45; 384/49
[58] Field of Search .......................... 384/45, 44, 43, 49

[56] References Cited

U.S. PATENT DOCUMENTS

| 4,527,840 | 7/1985 | Mugglestone | 384/45 |
| 4,616,886 | 10/1986 | Teramachi | 384/45 |
| 4,692,038 | 9/1987 | Kasai | 384/45 |
| 4,693,040 | 9/1987 | Teramachi | 384/45 X |

FOREIGN PATENT DOCUMENTS 212554 1/1990 Japan .

Primary Examiner—Thomas R. Hannon
Attorney, Agent, or Firm—Sughrue, Mion, Zinn, Macpeak & Seas; Richard C. Turner; Barry E. Negrin

[57] ABSTRACT

A linear motion rolling guide unit, together with allowing the rigidity of the overall unit to be increased in all directions when mounted on a frame, also attains a reduction in the dimension of height from the frame surface to the upper surface of the unit. This linear motion rolling guide unit offers the above advantages as a result of the points of intersection of matching lines of action of the force applied to rolling elements roughly coinciding with a plane that contains the mounting surfaces of a track rail for mounting that track rail to a frame.

3 Claims, 3 Drawing Sheets

LINEAR MOTION ROLLING GUIDE UNIT

BACKGROUND OF THE INVENTION

1. Field of the Invention

The present invention relates to a linear motion rolling guide unit that linearly guides a movable element to be moved in a linear motion mechanism such as a machine tool or industrial robot.

2. Description of the Prior Art

An example of this type of linear motion rolling guide unit of the prior art is shown in FIGS. 1 and 2. Furthermore, this linear motion rolling guide unit is disclosed in, for example, Japanese Utility Model Laid-Open No. 2-12554.

As shown in the drawings, said linear motion rolling guide unit has track rail 1, formed to have a roughly U-shaped cross-section opening upwards perpendicular to the direction of its elongation, and a slider in the form of sliding unit 3, arranged to be contained within said track rail 1 having rolling element circulating path (to be later described in detail), and able to move freely relative to said track rail 1.

Two track grooves 1a each, in the form of tracks having a semicircular cross-section, are formed along the lengthwise direction in the right and left inside portions of track rail 1. As shown in FIG. 2, four of said rolling element circulating paths are provided to correspond to each of these track grooves 1a. Each rolling element circulating path is composed of load bearing track groove 4a and return path 4b, each formed mutually in parallel in both the left and right sides of sliding unit 3, and roughly U-shaped direction changing paths (not shown) formed in the vicinity of both the front and back ends of sliding unit 3 which connect each loading bearing track groove 4a and return path 4b at both of their ends. Furthermore, said load bearing track groove 4a opposes track groove 1a of track rail 1.

A plurality of rolling elements in the form of balls 5 are arranged and housed within said rolling element circulating path that bear the load between track rail 1 and sliding unit 3 by circulating while rolling over track groove 1a accompanying movement of sliding unit 3.

The linear motion rolling guide unit having the constitution described above is, for example, arranged on a flat bed 7 in the form of a frame equipped on a machine tool (the entirety of which is not shown). Track rail 1 is fastened to said bed 7 by a plurality of bolts (with hexagon sockets, not shown). Consequently, track rail 1 has flat mounting surface 1b (shown in FIG. 2) for its bottom portion for mounting to bed 7.

Furthermore, as shown in FIG. 2, a plurality of countersunk portions 1c, having a diameter larger than the head portions of the above-mentioned bolts, and insertion holes 1d, having a diameter slightly larger than the threaded portions of said bolts, are concentrically formed in the bottom portion of track rail 1 and in rows in the lengthwise direction of said track rail 1. Said bolts are screwed into bed 7 by being inserted into said countersunk portions 1c and insertion holes 1d so that they are completed embedded. In addition, a plurality of threaded holes 3a are formed in the upper surface of sliding unit 3. Thus, a table supporting a workpiece and so forth (not shown) is fastened to said sliding unit 3 by bolts (with hexagon sockets, not shown) screwed into these threaded holes 3a.

A drive device, which drives the linear motion rolling guide unit 3 described above, is provided, and said drive device is composed as described below.

Namely, said drive device is composed of a ball screw, containing threaded shaft 9, a large number of balls 10, and a nut (not shown), and a torque application device (not shown), such as a motor, that applies torque to said threaded shaft 9 to rotate it. Furthermore, said nut is contained within sliding unit 3, and as is commonly known, together with balls 10 being juxtaposed between thread grooves formed in threaded shaft 9 and said nut, said balls 10 circulate accompanying rotation of threaded shaft 9 while being guided by the circulating path formed in sliding unit 3.

In the linear motion rolling guide unit described above, when threaded shaft 9 is rotated by an external motor, thrust is applied to the nut (not shown) screwed on via said threaded shaft 9 and balls 10 resulting in movement of sliding unit 3. Furthermore, the point of action 0 of this thrust is the axial center of threaded shaft 9.

In the linear motion rolling guide unit of the prior art described above, both arms of track rail 1, formed to have a roughly U-shaped cross-section, have the shortcoming of having low rigidity, being easily deformed in the manner of spreading to the outside due to the load applied to sliding unit 3.

In addition, since the height of the unit is large, the height from bed 7 of a table (not shown) attached on sliding unit 3 also becomes large, thus resulting in the shortcoming of contributing to an excessively large size of the machine tool and so forth in which it is incorporated.

SUMMARY OF THE INVENTION

In consideration of the shortcomings of the prior art described above, the object of the present invention is to provide a linear motion rolling guide unit that, together with allowing the rigidity of the entire unit to be increased in all directions when mounted on a frame, also attains a reduction in the dimension of height from the frame surface to the upper surface of the unit.

The present invention composes a linear motion rolling guide unit equipped with: a track rail, in which tracks are formed along the lengthwise direction on both sides, and having a mounting surface for its mounting on a prescribed frame; a slider, having rolling element circulating paths including load bearing track grooves corresponding to said tracks, that is able to move freely relative to said track rail; and, a plurality of rolling elements, arranged and contained within said rolling element circulating path, that bear the load while rolling over said tracks; wherein, the points of intersection of matching lines of action of the load applied to said rolling elements are positioned on, or in the vicinity of, a plane that contains said mounting surface.

DESCRIPTION OF THE PREFERRED EMBODIMENTS

The following provides an explanation of the embodiments of the present invention with reference to the attached drawings.

Figure 1:
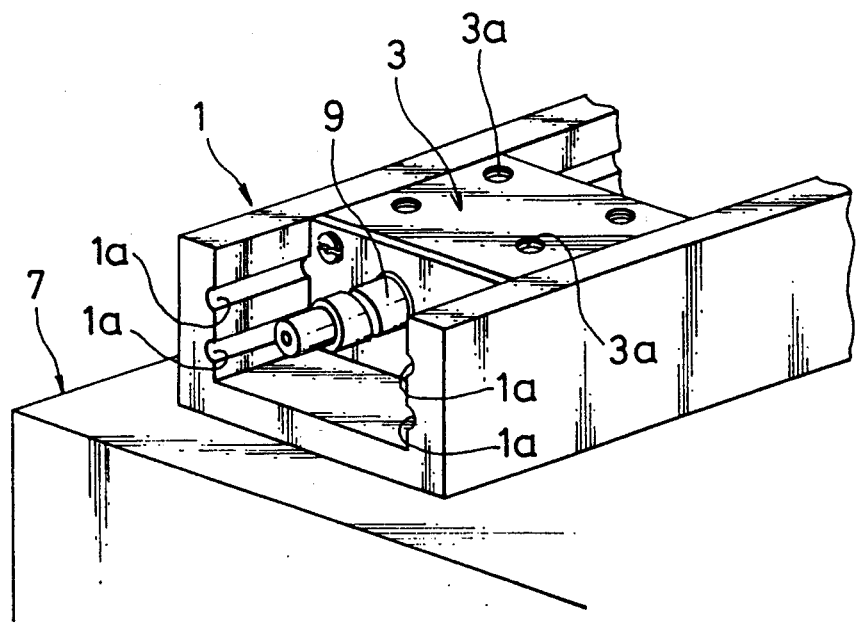
FIG. 1 is a perspective view showing the linear motion rolling guide unit of the prior art mounted on the bed of a machine tool and so forth.
Figure 2:
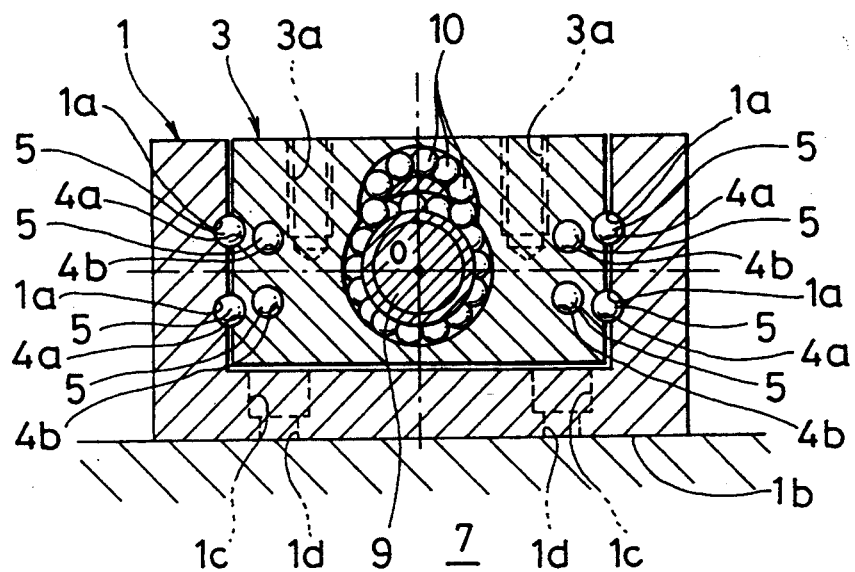
FIG. 2 is a vertical cross-sectional view showing the linear motion rolling guide unit shown in FIG. 1 along with the bed on which it is installed.
Figure 3:
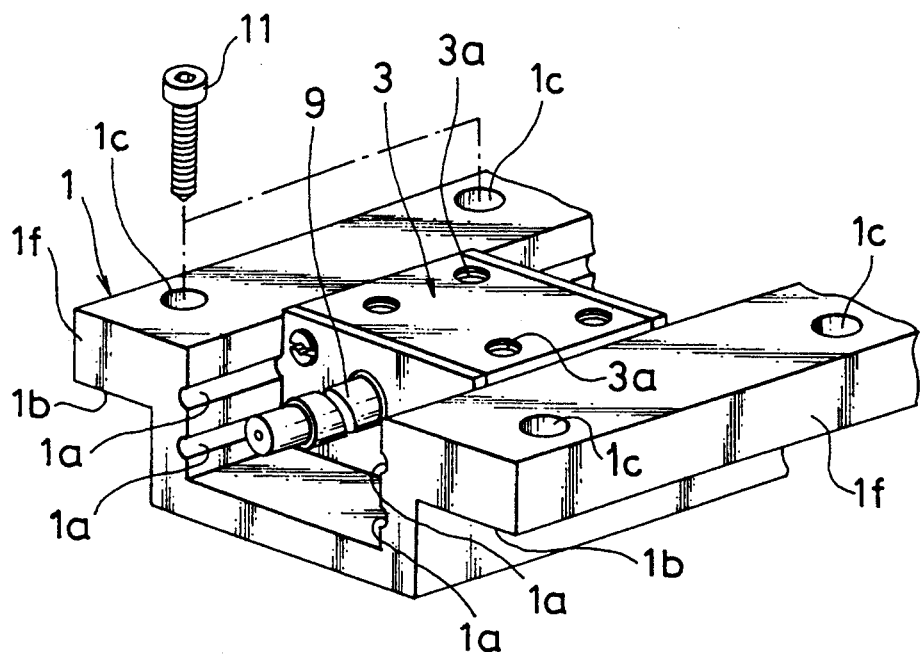
FIG. 3 is a perspective view showing the linear motion rolling guide unit as a first embodiment of the present invention, along with the essential components of the drive device for operating said unit.
Figure 4:
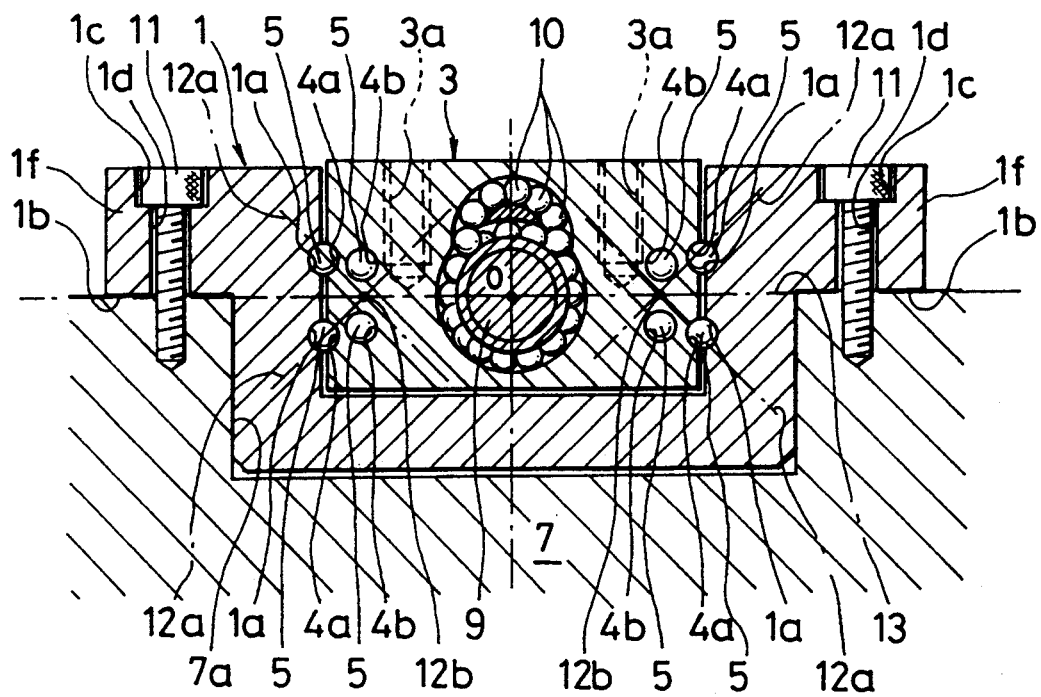
FIG. 4 is a vertical cross-sectional view showing the linear motion rolling guide unit shown in FIG. 3 mounted on the bed of a machine tool and so forth.

FIGS. 3 and 4 show a linear motion rolling guide unit as a first embodiment of the present invention, along with the drive device that operates said unit. Since said linear motion rolling guide unit is composed similarly to the linear motion rolling guide unit of the prior art shown in FIGS. 1 and 2 with the exception of those portions explained below, explanations of only the essential points will be given, with the more general construction of the unit as a whole omitted. For the same reason, the same reference numerals are used for those constituent members that are identical or correspond to the constituent members of said linear motion rolling guide unit of the prior art. In addition, this applies similarly to other embodiments to be described later.

As shown in the drawings, in said linear motion rolling guide unit, extensions 1f, which extend horizontally towards the outside, are formed on the upper ends of both the right and left sides of track rail 1. The lower surfaces of said extensions 1f form mounting surfaces 1b for mounting to bed 7. Thus, countersunk portions 1c and insertion holes 1d, for insertion of bolts 11 (with hexagon sockets) that fasten bed 7 to said track rail 1, are formed in these extensions 1f. Furthermore, as shown in FIG. 4, the portion of track rail 1 below these mounting surfaces 1b is inserted within concave portion 7a formed in bed 7. If the gap between the side walls of this concave portion 7a and the corresponding sides of track rail 1 is made to be essentially zero or only slight, the side walls of concave portion 7a support track rail 1 from both sides, thereby contributing to an increase in rigidity.

The points of intersection 12b of matching lines of action 12a of the load applied to each ball 5 mentioned above are made to be positioned either on or in the vicinity of a hypothetical plane 13 containing the above-mentioned mounting surfaces 1b. However, in the drawing, these points of intersection 12b are positioned on said hypothetical plane 13.

In this constitution, since the rigidity of the linear motion rolling guide unit is increased not only in the horizontal direction, but in all directions as well, it is difficult for strain, caused by the effects of the load applied to sliding unit 3 and the driving force transmitted through threaded shaft 9, to occur.

In addition, with respect to track rail 1 and sliding unit 3, since the portion positioned below the above-mentioned mounting surfaces 1b is embedded within concave portion 7a formed in bed 7, the dimension of height from the surface of said bed 7 to the upper surface of the linear motion rolling guide unit can be held to a low value, thus allowing reduced size of the machine tool and so forth in which said linear motion rolling guide unit is incorporated.

In addition, since mounting surfaces 1b of track rail 1 have a broad width, the mounting state with respect to bed 7 is stable.

Moreover, due to the rise in rigidity of the linear motion rolling guide unit as described above, said linear motion rolling guide unit acts as an effective reinforcing member for bed 7 on which said linear motion rolling guide unit is to be mounted, thus further contributing to increased rigidity of the machine tool and so forth.

Furthermore, in the present embodiment, the axial center of threaded shaft 9 of the ball screw, namely, point of action 0 of thrust, coincides with the level of each of the above-mentioned points of intersection 12b and hypothetical plane 13. Accordingly, this results in synergistic effects with the above-mentioned effects to particularly suppress the generation of strain caused by this thrust.

Figure 5:
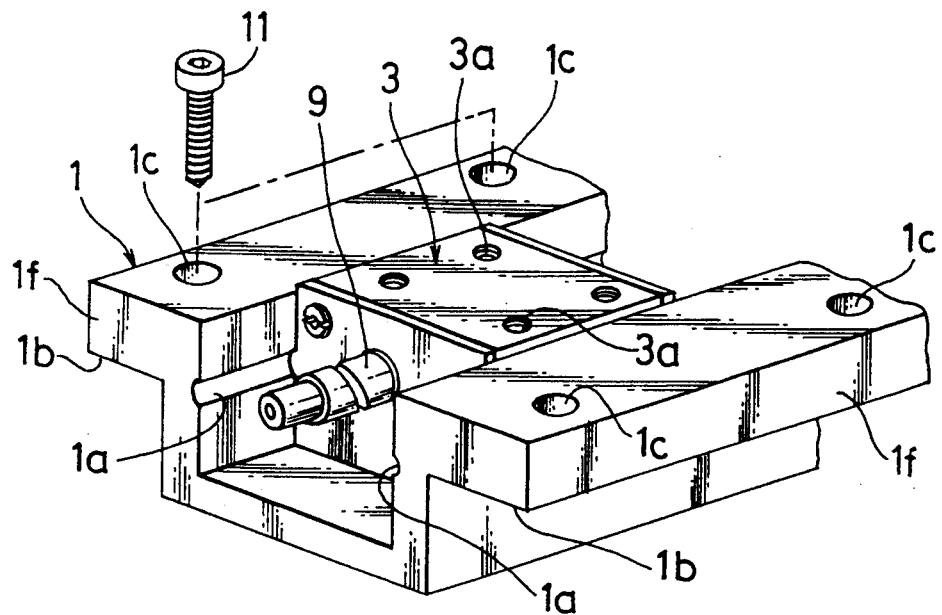
FIG. 5 is a perspective view showing the linear motion rolling guide unit as a second embodiment of the present invention, along with the essential components of the drive device for operating said unit.
Figure 6:
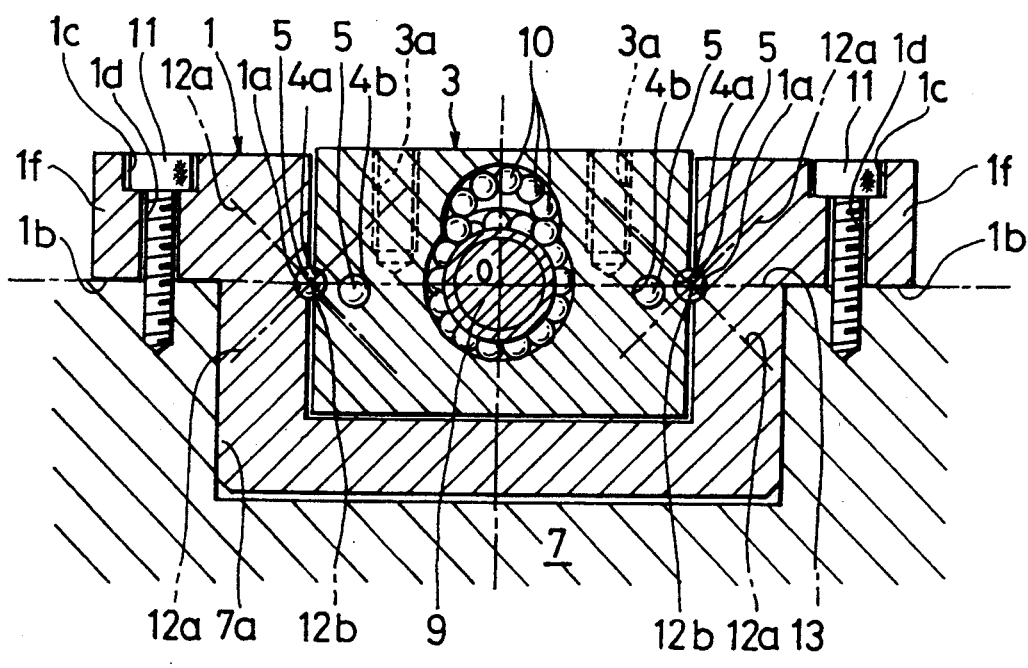
FIG. 6 is a vertical cross-sectional view showing the linear motion rolling guide unit shown in FIG. 5 mounted on the bed of a machine tool and so forth.

FIGS. 5 and 6 show a linear motion rolling guide unit as a second embodiment of the present invention.

As shown in the drawings, in said linear motion rolling guide unit, one each of track grooves 1a are formed in both sides of track rail 1. In the present embodiment, the points of intersection 12b of matching lines of action 12a of the load applied to each ball 5 on one of either side of track rail 1 either mutually coincides or roughly mutually coincides with a hypothetical plane 13 containing mounting surfaces 1b. In this constitution as well, effects are demonstrated that are similar to the linear motion rolling guide unit of the previously described first embodiment.

Furthermore, although a drive device containing a ball screw is shown for the drive device that drives sliding unit 3 in each of the embodiments mentioned above, it goes without saying that various other types of drive devices can also be applied, examples of which include a rack and pinion type, belt driving type or linear motor type. Furthermore, in the case of a drive device of the rack and pinion type, the rack is attached to either track rail 1 or sliding unit 3, the pinion is provided on the other, and torque is applied to said pinion to rotate. In addition, in the case of using a belt driving type of drive device, pulleys are arranged on both ends of track rail 1, a portion of the belt attached between said pulleys is coupled to sliding unit 3, and torque is applied to said pulleys to rotate and drive the belt. Moreover, in the case of employing a linear motor, either the primary side or secondary side on which said linear motor is equipped is attached to sliding unit 3 in the form of the moving side, and the other is installed on track rail 1 in the form of the stationary side.

In addition, although one each anti two each of track grooves 1a are formed in the right and left sides of track rail 1 in each of the above-mentioned embodiments, it goes without saying that the present invention can also be applied to linear motion rolling guide units having three or more track grooves on one side.

Moreover, although balls 5 are used for the rolling elements in each of the above-mentioned embodiments, a constitution may also be employed in which rollers are used.

According to the present invention as has been explained above, the points of intersection of matching lines of action of a load applied to rolling elements are positioned either on or in the vicinity of a plane containing the mounting surfaces of track rail for mounting said track rail to a frame. Since the rigidity of the linear motion rolling guide unit is increased in the horizontal direction as well as all other directions, said constitution offers the advantage of making it difficult for strain to occur caused by the effects of the load applied to the slider, the driving force that is transmitted and so forth.

In addition, with respect to the track rail and slider, since the portion positioned below the above-mentioned mounting surfaces is embedded within a concave portion formed in a frame, the dimension of height from the surface of said frame to the upper surface of the linear motion rolling guide unit is held to a low value, thereby offering the advantage of reduced size of the machine tool and so forth in which said linear motion rolling guide unit is incorporated.

In addition, since the mounting surfaces of the track rail have a broad width, there is the advantage of the mounting state becoming stable with respect to the frame.

Moreover, due to the rise in rigidity of the linear motion rolling guide unit as described above, said linear motion rolling guide unit acts as an effective reinforcing member for the frame and so forth on which said linear motion rolling guide unit is to be mounted, thus offering the advantage of further contributing to increased rigidity of the machine tool and so forth.

What is claimed is:

1. A linear motion rolling guide unit, comprising:
   a track rail, in which tracks are formed along the lengthwise direction on both sides, and having a planar mounting surface for mounting said guide unit on a frame;
   a slider, having rolling element circulating paths including load bearing track grooves corresponding to said tracks, that is able to move freely relative to said track rail; and
   a plurality of rolling elements, arranged and contained within said rolling element circulating paths, that bear the load while rolling over said tracks,
   wherein points of intersection of matching lines of action of the load applied to said rolling elements are positioned on, or in the vicinity of, a plane that contains said planar mounting surface.

2. The linear motion rolling guide unit set forth in claim 1 wherein a plurality of said tracks each are formed in both sides of said track rail.

3. The linear motion rolling guide unit set forth in claim 1, wherein one of said tracks is formed on a first side of said track rail and one of said tracks is formed on a second side of said track rail, said second side being opposite said first side.

* * * * *